W. H. KAISER.
HAY FORK.
APPLICATION FILED JULY 22, 1910.

985,418.

Patented Feb. 28, 1911.
2 SHEETS—SHEET 1.

Witnesses:
R. W. Bailey.
H. E. Chase.

Inventor:
W. H. Kaiser
By Howard P. Denison
Attorney.

W. H. KAISER.
HAY FORK.
APPLICATION FILED JULY 22, 1910.
985,418.
Patented Feb. 28, 1911.
2 SHEETS—SHEET 2.
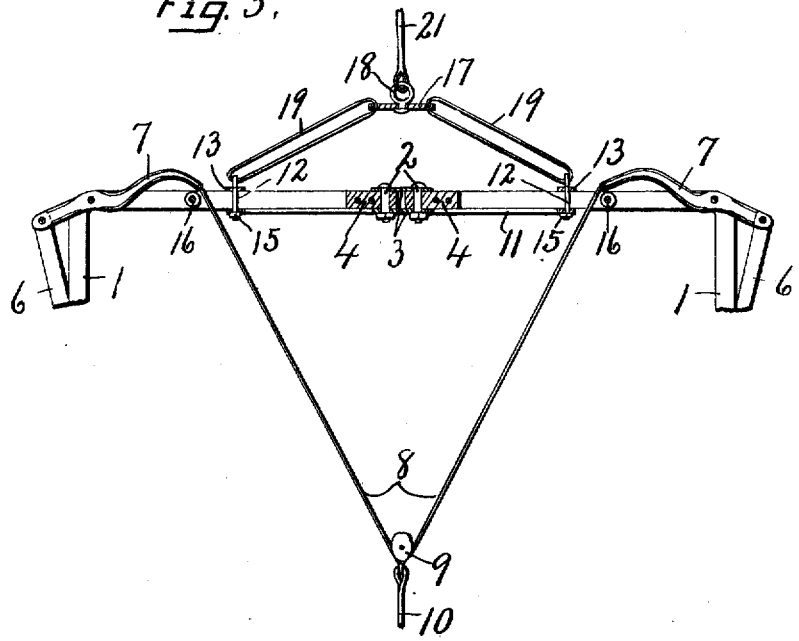
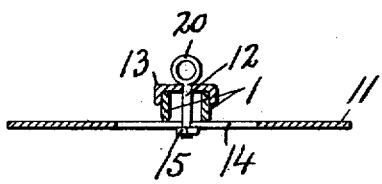
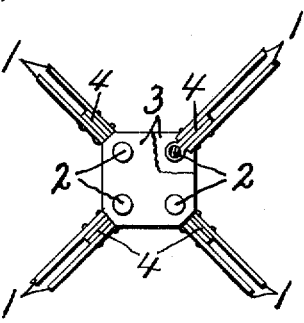
Witnesses:
R. W. Bailey.
H. E. Chase
Inventor:
W. H. Kaiser
By Haward P. Denison
Attorney.

UNITED STATES PATENT OFFICE.

WILLIAM H. KAISER, OF LYONS, NEW YORK.

HAY-FORK.

985,418.  Specification of Letters Patent. Patented Feb. 28, 1911.

Application filed July 22, 1910. Serial No. 573,233.

*To all whom it may concern:*

Be it known that I, WILLIAM H. KAISER, of Lyons, in the county of Wayne, in the State of New York, have invented new and useful Improvements in Hay-Forks, of which the following, taken in connection with the accompanying drawings, is a full, clear, and exact description.

This invention relates to certain improvements in hay forks of the harpoon type, in which the tines are equipped with suitable barbs adapted to be moved into and out of operative position by suitable operating mechanism hereinafter described. These forks usually consist of an inverted U-shaped bar or a pair of L-shaped tines, sometimes having their lateral offset portions hinged to each other for relative vertical rocking movement so as to enable the points of the tines to be spread apart when projected into the hay, and to be drawn together during the lifting operation.

The object of my present invention is to provide a plurality of pairs of inverted L-shaped tines arranged about a common center and relatively adjustable circumferentially or laterally, so as to grapple a greater area and therefore a greater quantity of the hay in a single operation than would be possible with a two-tine fork.

Another object of the lateral adjustment is to permit the tines to be folded toward each other into compact space for storage or transportation.

A further object is to provide means for clamping the tines in their adjusted position for use.

Other objects and uses will be brought out in the following description.

Figure 1:
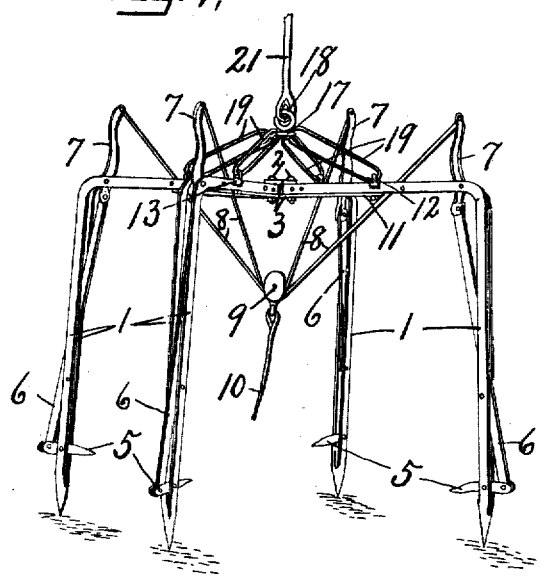
Figure 2:
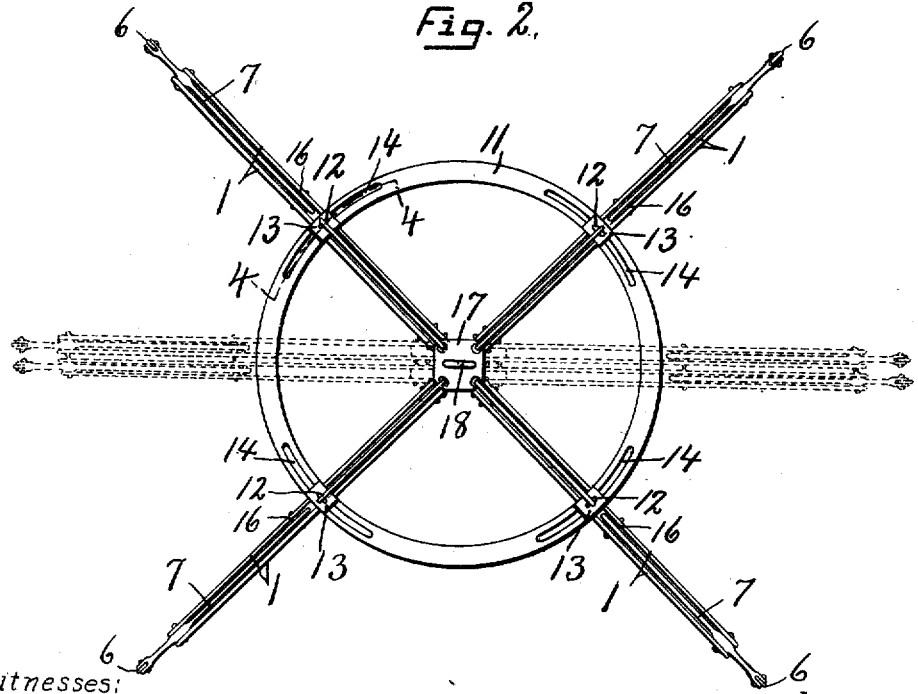

In the drawings: Figure 1 is a perspective view of my improved hay fork, shown in its open position ready for use. Fig. 2 is an enlarged top plan of the same fork except that the hoisting cable is omitted. Fig. 3 is a transverse vertical sectional view through the upper portion of diametrically opposite tines, showing the supporting ring, clamping devices and lifting cable, and also the barb operating mechanism. Fig. 4 is an enlarged sectional view taken on line 4—4, Fig. 2, showing particularly the means for clamping the tines to the supporting ring. Fig. 5 is an enlarged top plan of the center tine supporting head and showing the adjacent ends of the tines hinged thereto.

This hay fork comprises a plurality of, in this instance, four inverted L-shape tines —1— arranged about a common center with their upper offset portions projecting inwardly toward said center and pivoted at —2— to a central supporting head —3— so as to permit the tines to be adjusted laterally or horizontally to different angles relatively to each other, for the purpose of covering or grappling a considerably larger area or quantity of hay than would be possible with a two tine fork, and at the same time permit the tines to be folded flatwise, one against the other at one side of the head, or in pairs at opposite sides of the head for compactness in storage or transportation.

Each tine preferably consists of a pair of parallel bars, spaced apart throughout the greater portion of their lengths, but merged, by welding or otherwise, into a sharp point at their lower ends to facilitate their entrance into hay under pressure.

Secured to and between the parallel bars of the inner end of the upper offset portion of each tine is a strap hinge section —4—, through which the corresponding pivotal bolt is passed.

Pivoted between the bars of each tine, near its lower end, is a barb or pointed lever —5— having its pointed end movable into and out of engagement with the hay, each barb being connected by a link —6— to a lever —7—, which, in turn, is connected by a cable —8— to a fall block or sheave —9—, the latter being connected to a suitable pull cord or cable —10— depending therefrom, whereby all of the barbs may be operated simultaneously to release the load. The levers —7— are pivoted between the bars of their corresponding tines near the bends or junctions of the upright with the horizontal portions thereof, the link —6— also playing between the bars of the corresponding tines.

The head —3— preferably consists of a pair of flat metal plates arranged respectively above and beneath the inner ends of the hinged sections —4— of the tines, and held in place by the pivotal bolts —2—.

A ring —11— of considerably greater diameter than that of the head —3— is arranged concentrically with the axis of said head against the under sides of the upper horizontal portions of the tines —1— and is held in place by I-bolts —12— and clips —13—. The I-bolts —12— are passed centrally through the clip plates —13— between the bars of the tines —1— and through elongated slots —14— in the underlying ring —11— thus permiting a limited lateral or horizontal adjustment of the tines relatively to each other and to the ring —11—, each clamping bolt being provided with a nut —15— engaging the lower face of the ring to hold the tine in its adjusted position. It is now clear that by loosening the clamping bolts —12— the tines may be adjusted at right angles to each other for grappling a maximum area of hay at four points, or they may be adjusted to different angles for varying the quantity of hay to be lifted or transferred the load depending upon the amount of horsepower available for the work.

The levers —7— are connected in pairs to the fall block —9— by continuous cables or ropes —8— which, during the operation of the levers, ride over suitable rollers or bearings —16— between and separated by the bars of the tines, said rollers being located just beyond or outside of the periphery of the rings —11—.

The clip plates —13— rest upon and against the upper edges and sides of the bars of the tines —1— to prevent lateral displacement of the tines.

A lifting head —17— having an eye —18— is flexibly connected by links —19— to the eyes as —20— of the bolts —12—, said lifting head —17— being located centrally directly over the head —3— and its eye —18— is connected to a suitable hoisting cable —21— arranged in the usual manner for hoisting and conveying the load or fork from one locality to another.

In operation, when it is desired to force the fork into the hay, the levers —7— are rocked downwardly thereby forcing the points of the bars —5— within the plane of the tines and after the tines have been forced into the hay the levers are raised by hand to sufficiently force the barbs into the hay and to lock them in said position by throwing the pivotal connections between the levers and their respective links into a substantially straight line between the pivots of the levers and pivotal connections between the links and barbs. The fork with the load therein is now ready to be lifted and conveyed to the desired locality by means of the cable —1— whereupon the levers —7— may be operated by means of the pull cord —10—, fall block —9—, and ropes —8— to withdraw the barbs —5— from the hay, thereby releasing the load and positioning the barbs ready for a repetition of the operation just described.

What I claim is:

1. A hay fork comprising a head, tines pivoted to the head to swing horizontally toward and from each other, movable barbs on the tines and means for operating the barbs.

2. A hay fork comprising a plurality of tines relatively adjustable horizontally about different axes, and means for holding the tines in their adjusted position.

3. A hay fork comprising a pair of tines, one at least of which is adjustable horizontally relatively to the other, barbs pivoted to the tines, and operating means for the barbs.

4. A hay fork comprising a plurality of tines, connections between the upper ends of the tines to permit said tines to swing laterally relatively to each other, barbs on the lower end of the tines, lifting means attached to the tines between said connections and barbs and operating means for the barbs.

In witness whereof I have hereunto set my hand this 13 day of July 1910.

WILLIAM H. KAISER.

Witnesses:
 GEO. H. MILEM,
 HENRY L. JENNINGS.

---

Copies of this patent may be obtained for five cents each, by addressing the "Commissioner of Patents Washington, D. C."